(12) United States Patent  
Fechner

(10) Patent No.: US 8,575,560 B1
(45) Date of Patent: Nov. 5, 2013

(54) INTEGRATED CIRCUIT CUMULATIVE DOSE RADIATION SENSOR

(75) Inventor: Paul S. Fechner, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/529,556

(22) Filed: Jun. 21, 2012

(51) Int. Cl.
G01T 1/24 (2006.01)

(52) U.S. Cl.
USPC .................................. 250/370.14

(58) Field of Classification Search
USPC ....................... 250/370.01–370.15
See application file for complete search history.

(56) References Cited

U.S. PATENT DOCUMENTS

| | | | |
|---|---|---|---|
| 4,593,384 A | 6/1986 | Kleijne | |
| 5,117,457 A | 5/1992 | Comerford et al. | |
| 5,173,609 A * | 12/1992 | Lacoste et al. | 250/370.07 |
| 5,309,387 A | 5/1994 | Mori | |
| 5,389,738 A | 2/1995 | Piosenka et al. | |
| 5,712,973 A | 1/1998 | Dayan et al. | |
| 6,246,970 B1 | 6/2001 | Silverbrook et al. | |
| 6,388,574 B1 | 5/2002 | Davis et al. | |
| 6,421,213 B1 | 7/2002 | Blyth | |
| 6,895,509 B1 | 5/2005 | Clark | |
| 7,188,282 B2 | 3/2007 | Walmsley | |
| 7,472,305 B1 | 12/2008 | Hershman et al. | |
| 7,498,644 B2 | 3/2009 | Shapiro et al. | |
| 7,718,963 B2 | 5/2010 | Seefeldt et al. | |
| 7,795,087 B2 | 9/2010 | Roizin et al. | |
| 7,800,156 B2 | 9/2010 | Roizin | |
| 7,837,110 B1 | 11/2010 | Hess et al. | |
| 7,906,805 B2 | 3/2011 | Sadd et al. | |
| 7,978,556 B2 | 7/2011 | Macerola et al. | |
| 2004/0017224 A1 * | 1/2004 | Tumer et al. | 327/51 |
| 2007/0255966 A1 | 11/2007 | Condorelli et al. | |
| 2008/0114582 A1 | 5/2008 | Leterrier et al. | |
| 2010/0090714 A1 | 4/2010 | Van Geloven et al. | |
| 2010/0096556 A1 | 4/2010 | Arsalan et al. | |
| 2010/0225380 A1 | 9/2010 | Hsu et al. | |
| 2011/0147806 A1 | 6/2011 | Wilson et al. | |

FOREIGN PATENT DOCUMENTS

KR  2010-0062652  6/2010

OTHER PUBLICATIONS

Neve et al., "Memories: A Survey of Their Secure Uses in Smart Cards," 10 pages, Second IEEE International Security in Storage Workshop, Oct. 2003.
Application Entitled "Integrated Radiation Sensitive Circuit," Filed Jun. 21, 2012.
Application Entitled "Integrated Comparative Radiation Sensitive Circuit," Filed Jun. 21, 2012.
"In-Chip Anti-Tamper Sensor Technology (ICAT)" 6 pages, Feb. 6, 2009, downloadable from http://web.archive.org/web/20090401000000*/http://accordsol.com/icat.html (previously submitted in IDS dated Jun. 21, 2012).

* cited by examiner

Primary Examiner — Kiho Kim
(74) Attorney, Agent, or Firm — Shumaker & Sieffert, P.A.

(57) ABSTRACT

This disclosure is directed to devices, integrated circuits, and methods for sensing cumulative radiation doses. In one example, a device includes a cell configured to be set to an initial resistance and to vary in resistance cumulatively in response to incident radiation. The device also includes an output terminal connected to the cell and configured to vary in voltage in response to the resistance of the cell. The device also includes a comparator configured to deliver an output signal in response to the voltage of the output terminal reaching a threshold voltage. The device also includes a cell charging circuit configured to reset the cell to the initial resistance in response to the output signal from the comparator. The device also includes a counter configured to count a number of times the comparator delivers the output signal.

20 Claims, 4 Drawing Sheets

INTEGRATED CIRCUIT CUMULATIVE DOSE RADIATION SENSOR

This disclosure relates to a radiation sensor, and more particularly, to radiation sensors designed to detect cumulative amounts of radiation.

BACKGROUND

In various applications, it is important to track a cumulative dose of any of various types of radiation to which a device or product has been exposed over time. This may be the case in electronic, medical, and food safety applications, for example.

SUMMARY

This disclosure is directed to devices, integrated circuits, and methods for sensing cumulative radiation doses.

In one example, a device includes a cell configured to be set to an initial resistance and to vary in resistance cumulatively in response to incident radiation. The device also includes an output terminal connected to the cell and configured to vary in voltage in response to the resistance of the cell. The device also includes a comparator configured to deliver an output signal in response to the voltage of the output terminal reaching a threshold voltage. The device also includes a cell charging circuit configured to reset the cell to the initial resistance in response to the output signal from the comparator. The device also includes a counter configured to count a number of times the comparator delivers the output signal.

In another example, an integrated circuit includes an EEPROM cell. The EEPROM cell includes a floating gate, charging terminals, a ground terminal, and an output terminal. The EEPROM cell is configured to apply a resistance between the ground terminal and the output terminal that varies in response to radiation incident to the floating gate. The integrated circuit also includes a cell charging circuit connected to the charging terminals and configured to charge the EEPROM cell to apply an initial resistance between the ground terminal and the output terminal. The integrated circuit also includes a reference resistor connected between the output terminal and a voltage source terminal. The output terminal has a voltage that varies in response to the varying of the resistance applied by the EEPROM cell between the ground terminal and the output terminal. The integrated circuit also includes a comparator that includes a first input connected to the output terminal and a second input connected to a threshold voltage. The comparator is configured to deliver an output signal in response to the voltage of the output terminal reaching the threshold voltage. The cell charging circuit is configured to receive the output signal from the comparator and to recharge the EEPROM cell to apply the initial resistance in response to receiving the output signal from the comparator. The integrated circuit also includes a counter configured to count a number of times the comparator delivers the output signal.

In another example, a method includes setting a resistance of a cell between a ground terminal and an output terminal to an initial resistance. The method further includes varying the resistance of the cell cumulatively in response to incident radiation. A voltage of the output terminal varies as a function of the resistance of the cell. The method further includes delivering an output signal in response to the voltage of the output terminal reaching a threshold voltage. The method further includes resetting the cell to the initial resistance in response to the output signal. The method further includes counting a number of times the output signal is delivered.

The details of one or more examples are set forth in the accompanying drawings and the description below. Other features, objects, and advantages will be apparent from the description and drawings, and from the claims.

DETAILED DESCRIPTION

Some of the examples described in the disclosure may be directed to a devices, integrated circuits, and methods for an integrated cumulative dose radiation sensor. In various examples, an integrated cumulative dose radiation sensor as described herein may be implemented entirely in complementary metal-oxide-semiconductor (CMOS) circuitry that may be incorporated in any CMOS integrated circuit. In various examples, an integrated cumulative dose radiation sensor as described herein may track a cumulative dose of one or more selected types of radiation on an integrated circuit at all times, whether or not the integrated circuit is powered. In various examples, an integrated circuit incorporating an integrated cumulative dose radiation sensor as described herein, when it is powered up or at any time thereafter, may automatically read the cumulative dose of radiation as indicated by the cumulative dose radiation sensor, and perform a selected action in response to certain readings from the integrated cumulative dose radiation sensor. For example, in various implementations, the integrated circuit may respond to a certain reading by the integrated cumulative dose radiation sensor by disabling itself, or erasing data from a memory component, or delivering a signal indicating whether or not the integrated circuit has been exposed to more than a selected cumulative dose of radiation. An integrated cumulative dose radiation sensor may be implemented as just a portion of a single integrated circuit, and may therefore be implemented with small size, low mass, and low cost, in various examples.

Figure 1:
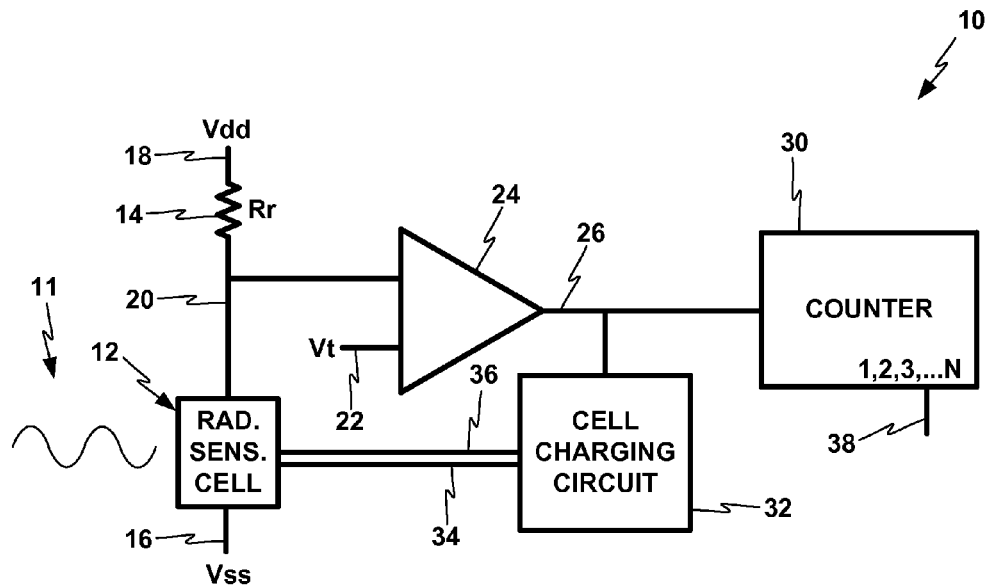
FIG. 1 is a circuit diagram of an illustrative example of a cumulative dose radiation sensor device of this disclosure.

FIG. 1 is a circuit diagram of an illustrative example of a cumulative dose radiation sensor device 10 of this disclosure. Cumulative dose radiation sensor device 10 includes a radiation sensitive cell 12. Radiation sensitive cell 12 may be sensitive to any one or more of a variety of types, frequencies, energies, or wavelengths of radiation, such as example incident radiation wave 11. Radiation sensitive cell 12 may be configured to be set to an initial electrical resistance, and to vary in resistance cumulatively in response to radiation incident on radiation sensitive cell 12, for radiation of an energy to which radiation sensitive cell 12 is sensitive. Radiation sensitive cell 12 may vary in resistance cumulatively in response to incident radiation in that radiation sensitive cell 12 varies in resistance proportionally to the amount of radiation that strikes radiation sensitive cell 12, for at least a certain amount of radiation and over at least a certain range of resistance.

For example, radiation sensitive cell 12 may be set to an initial resistance, and then, if radiation sensitive cell 12 is exposed to a first dose of radiation, its resistance may change to a second value of resistance. If radiation sensitive cell 12 is later exposed to a second dose of radiation, its resistance may change to a third value of resistance. If one of the doses of radiation has a longer duration or higher intensity, or otherwise has a relatively higher total energy, the resistance of radiation sensitive cell 12 may change by a relatively greater amount. Radiation sensitive cell 12 may continue to vary in resistance in response to cumulative doses of radiation over a total range that may be defined by cumulative dose radiation sensor device 10, as detailed below. The rate of change of resistance of radiation sensitive cell 12 in response to incident radiation is not necessarily the same across its entire range of variability, i.e., the rate of change of resistance may increase or decrease in response to the same dose of radiation depending on what the resistance currently is in the range of variability the resistance, in some examples.

Radiation sensitive cell 12 may be sensitive to any one or more of a variety of types, frequencies, energies, or wavelengths of radiation. For example, radiation sensitive cell 12 may be sensitive to electromagnetic (EM) radiation having energies of approximately 1.6 electron-volts (eV) or higher, i.e., wavelengths of approximately 750 nanometers or less, i.e., visible wavelengths or shorter, with shorter wavelength radiation including ultraviolet, X-ray, or gamma ray wavelengths. In other examples, radiation sensitive cell 12 is not sensitive to visible wavelengths but is sensitive to EM radiation of ultraviolet or higher energies, i.e., approximately 3.3 eV or higher. In still other examples, radiation sensitive cell 12 may be sensitive only to EM radiation of X-ray or higher energy, i.e., approximately 120 eV or higher; or only to EM radiation of hard X-ray or higher energy, i.e., approximately 12 kilo-electron-volts (keV) or higher. In other examples, radiation sensitive cell 12 may be sensitive to a selected range bounded by both an upper bound and a lower bound, such as only visible light, for example. In other examples, radiation sensitive cell 12 may be sensitive to infrared wavelength EM radiation as well as visible and higher-energy radiation, or may be selectively sensitive to certain ranges of wavelengths, or may be sensitive to any other range or combination of ranges of wavelengths. Radiation sensitive cell 12 may or may not also be sensitive to other types of radiation besides electromagnetic, such as cosmic rays, for example.

Cumulative dose radiation sensor device 10 also includes a ground terminal 16 and a cell output terminal 20 both connected to the radiation sensitive cell 12, in the example of FIG. 1. Cell output terminal 20 may be configured to vary in voltage in response to the resistance of the radiation sensitive cell 12. In particular, cell output terminal 20 may be connected to source voltage terminal 18 through a reference resistor 14, while cell output terminal 20 is also connected to ground terminal 16 through radiation sensitive cell 12 in a way that applies the varying resistance of radiation sensitive cell 12 to the electrical connection between cell output terminal 20 and ground terminal 16. Therefore, as the resistance of radiation sensitive cell 12 varies, the voltage of cell output terminal 20 also varies as a function of the varying of the resistance of radiation sensitive cell 12, in this example. In particular, in this example, the variable voltage Vv of cell output terminal 20 as a function of the variable resistance Rs of radiation sensitive cell 12 may take the form of Equation 1:

$$Vv = Vdd * Rs / (Rs + Rr) \qquad \text{(Eq. 1)}$$

Source voltage terminal 18 is labeled "Vdd" and ground voltage terminal 16 is labeled "Vss" in keeping with standard CMOS convention, though cumulative dose radiation sensor device 10 may also be implemented in non-CMOS technologies. Ground voltage terminal 16 is not necessarily at ground, but may be at a lower voltage than source voltage terminal 18. In other examples, ground voltage terminal 16 and source voltage terminal 18 may also be reversed.

Cumulative dose radiation sensor device 10 also includes a comparator 24, which is connected to cell output terminal 20 and a threshold voltage Vt on a second comparator input terminal 22 for its two inputs. Comparator 24 is configured to deliver an output signal on comparator signal terminal 26 in response to the voltage of the cell output terminal 20 reaching a certain threshold voltage. That threshold voltage is the threshold voltage Vt on the second comparator input terminal 22, in this example, so that when the variable voltage Vv of cell output terminal 20 reaches or crosses the threshold voltage Vt on the second comparator input terminal 22, the comparator 24 delivers the output signal on comparator signal terminal 26.

In some examples, the resistance Rs of radiation sensitive cell 12 may be set to an initial resistance that is relatively high, and the voltage Vv of cell output terminal 20 may also have an initial value that is close to the source voltage Vdd, which may be higher than the threshold voltage Vt. In these examples, the resistance Rs of radiation sensitive cell 12 may be configured to decrease cumulatively as it is struck by incident radiation, and the voltage Vv of cell output terminal 20 may correspondingly decrease toward zero or toward Vss in response to the decreasing of the resistance Rs of radiation sensitive cell 12. If a certain threshold amount of cumulative radiation strikes radiation sensitive cell 12, it may drive the voltage Vv of cell output terminal 20 below the threshold voltage Vt on the second comparator input terminal 22, which may cause comparator 24 to deliver the output signal on comparator signal terminal 26.

In other examples, the resistance Rs of radiation sensitive cell 12 may be set to an initial resistance that is relatively low, and the voltage Vv of cell output terminal 20 may also have an initial value that is close to zero or to the ground voltage Vss, which may be lower than the threshold voltage Vt. In these examples, the resistance Rs of radiation sensitive cell 12 may be configured to increase cumulatively as it is struck by incident radiation, and the voltage Vv of cell output terminal 20 may correspondingly increase toward the source voltage Vdd in response to the increasing of the resistance Rs of radiation sensitive cell 12. If a certain threshold amount of cumulative radiation strikes radiation sensitive cell 12, it may drive the voltage Vv of cell output terminal 20 above the threshold voltage Vt on the second comparator input terminal 22, which may cause comparator 24 to deliver the output signal on comparator signal terminal 26.

In various examples, cumulative dose radiation sensor device 10 may define a threshold amount of radiation that may be cumulatively received by radiation sensitive cell 12 before comparator 24 delivers its output signal.

Comparator signal terminal 26 connects the signal output of comparator 24 to both a cell charging circuit 32 and a counter 30. The cell charging circuit 32 may be configured to reset the radiation sensitive cell 12 to the initial resistance in response to the output signal from the comparator 24. Cell charging circuit 32 is illustratively connected to radiation sensitive cell 12 via two charging terminals 34 and 36 in this example. Cell charging circuit 32 may be enabled to reset the radiation sensitive cell 12 back to its initial resistance, and thereby also to cause cell output terminal 20 to return to its initial voltage.

Counter 30 may be configured to count a number of times the comparator 24 delivers the output signal via comparator signal terminal 26. Counter 30 may count one count for the first time comparator 24 delivers the output signal, while cell charging circuit 32 also resets radiation sensitive cell 12 to its initial resistance. If radiation sensitive cell 12 subsequently receives enough radiation cumulatively to add up to the threshold amount of radiation once again, i.e., enough radiation to alter the resistance Rs of radiation sensitive cell 12 and the voltage Vv of cell output terminal 20 enough to reach the threshold voltage Vt once again, then comparator 24 repeats the process of delivering the output signal via comparator signal terminal 26 to counter 30 and cell charging circuit 32. Counter 30 may then add another count to its cumulative count of the number of times radiation sensitive cell 12 has cumulatively received the threshold amount of radiation. Cell charging circuit 32 may also once again reset radiation sensitive cell 12 to the initial resistance, and thereby also reset the voltage of cell output terminal 20 to its initial voltage and configure cumulative dose radiation sensor device 10 to continue responding to and counting the number of times radiation sensitive cell 12 cumulatively receives the threshold dose of radiation.

Cumulative dose radiation sensor device 10 may enable the varying of the resistance Rs of radiation sensitive cell 12 cumulatively in response to incident radiation to be performed regardless of whether radiation sensitive cell 12 is powered as it tracks the cumulative dose of radiation. That is, cumulative dose radiation sensor device 10 may spend one or more periods of time unpowered. When cumulative dose radiation sensor device 10 is unpowered, source voltage terminal 18 may be at zero voltage instead of at the source voltage Vdd, and cell output terminal 20 may be at zero voltage instead of a voltage dependent on the resistance Rs of radiation sensitive cell 12, while second comparator input terminal 22 may also be at zero voltage instead of at the threshold voltage Vt. However, radiation sensitive cell 12 may nonetheless retain any changes to its resistance Rs that records its cumulative dose of incident radiation, regardless of whether or not cumulative dose radiation sensor device 10 is powered or unpowered at various times, and regardless of whether the voltages of source voltage terminal 18 or other terminals in cumulative dose radiation sensor device 10 go to zero.

If cumulative dose radiation sensor device 10 has been unpowered and the voltages of source voltage terminal 18 and second comparator input terminal 22 have been at zero, when cumulative dose radiation sensor device 10 is powered up, cumulative dose radiation sensor device 10 may compare the voltage of cell output terminal 20 with the threshold voltage Vt at second comparator input terminal 22 rapidly in response to power up (i.e., in response to the return of power and voltage). With normal source voltage Vdd restored to source voltage terminal 18, this raises cell output terminal 20 to a voltage that is a function of and that signals the current level of the resistance Rs of radiation sensitive cell 12. With the second comparator input terminal 22 also returned to the threshold voltage Vt, comparator 24 then responds appropriately to whether the voltage of cell output terminal 20 has reached or crossed the threshold voltage Vt of the second comparator input terminal 22. Comparator 24 therefore provides the output signal on comparator signal terminal 26 if radiation sensitive cell 12 has received the threshold amount of radiation cumulatively over time, since radiation sensitive cell 12 was initially set or reset to its initial voltage.

In various other examples, cumulative dose radiation sensor device 10 may be incorporated in an integrated circuit or other device that also includes an internal battery or other power source, and that maintains an internal voltage in the absence of any external power source, including for source voltage Vdd at source voltage terminal 18 and for threshold voltage Vt at second comparator input terminal 22. In these examples, cumulative dose radiation sensor device 10 may continue to function normally at all times, regardless of whether it is attached to any external power source, at least for as long as the internal power source continues to provide voltage effectively. Even if the integrated circuit or other device that includes cumulative dose radiation sensor device 10 continues for a significant duration of time without any external power source and its internal power source ultimately fails, radiation sensitive cell 12 may still continue to vary its resistance cumulatively in response to cumulative doses of radiation, such that when cumulative dose radiation sensor device 10 is once again connected to a power source and returned to normal voltages, cumulative dose radiation sensor device 10 may still thereafter receive a count from counter 30 indicating whether radiation sensitive cell 12 has been exposed to the threshold amount of radiation, as described above.

Radiation sensitive cell 12 may intercept relatively smaller doses of incident radiation with significant intervals of time in between receiving any radiation, but still persistently retain the changes to its resistance in between doses over significant durations of time, in various examples, and therefore still accurately track cumulative doses of radiation over time. In various other examples, the resistance of radiation sensitive cell 12 may vary over relatively long periods of time due to other effects independent of incident radiation, such as electron tunneling or other electron leakage. Cumulative dose radiation sensor device 10 may include additional circuitry or other means for compensating for or correcting for this additional rate of change in the resistance Rs over time.

As one example, radiation sensitive cell 12 may have a known rate of decrease of its resistance Rs by 1% per year due to electron tunneling, independent of any exposure to radiation. Cumulative dose radiation sensor device 10 may correct for this by causing a small variation in the threshold voltage Vt over time to produce an equivalent response profile from the comparator 24 as if radiation sensitive cell 12 had no non-radiation-dependent variation in resistance. In another example, cumulative dose radiation sensor device 10 may correct for this non-radiation-dependent variation in resistance of radiation sensitive cell 12 by periodically providing a small interim charge to radiation sensitive cell 12 that is just enough to compensate for the non-radiation-dependent variation in resistance, while still enabling radiation sensitive cell 12 accurately to track the cumulative dose of incident radiation. Other examples may experience other rates of electron leakage higher or lower than the specific example mentioned above, or other secondary effects, and such examples may implement techniques to compensate for such effects. In still other examples, radiation sensitive cell 12 may experience no electron tunneling or other effects that induce any changes in the resistance Rs it applies other than the cumulative dose of radiation of the selected type or range.

Cumulative dose radiation sensor device 10 may also operate effectively while conserving power by delivering power to radiation sensitive cell 12 at intervals of time, wherein radiation sensitive cell 12 is unpowered between the intervals of time, in various examples. In this case, cumulative dose radiation sensor device 10 may deliver the source voltage Vdd at source voltage terminal 18 and the threshold voltage Vt at second comparator input terminal 22 (and perform any operation, if needed, to ensure that ground terminal 16 is at the system's ground voltage Vss) for a more or less brief period during the intervals of time. The interval may be at least long enough for the normal operation of comparator 24 to compare the voltage Vv of cell output terminal 20 with the threshold voltage Vt at second comparator input terminal 22, and for the counter 30 to add a count and for cell charging circuit 32 to recharge radiation sensitive cell 12 if comparator 24 delivers its output signal.

Comparator 24 may therefore deliver the output signal via comparator signal terminal 26 in response to the voltage Vv of cell output terminal 20 reaching threshold voltage Vt only during the intervals when power is provided to radiation sensitive cell 12. This may also allow radiation sensitive cell 12 to signal whether it has been exposed to the threshold amount of radiation for each duration of time between each adjacent pair of intervals. This may also help ensure that radiation sensitive cell 12 doesn't undercount the cumulative radiation dose to which it has been exposed by going too long between reporting to the comparator 24 and spending time outside its response range, as it might do if it were to be exposed to more than a certain amount of radiation with too long between powered intervals.

Figure 2:
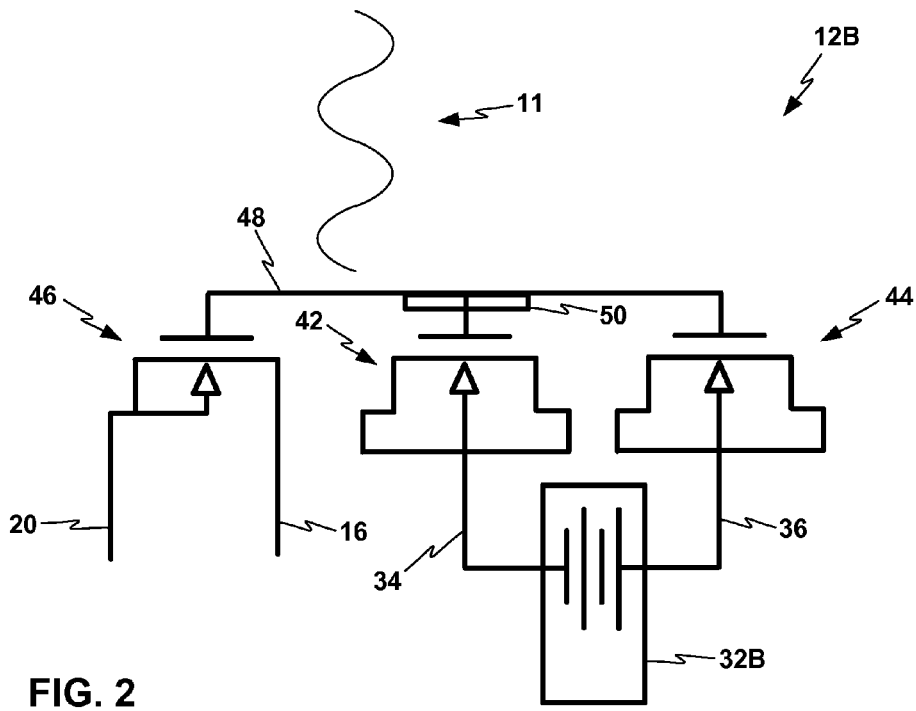
FIG. 2 is a circuit diagram of an illustrative example of a radiation sensitive cell that may be part of a cumulative dose radiation sensor device of this disclosure.

FIG. 2 is a circuit diagram of an illustrative example of a radiation sensitive cell 12B that may be part of a cumulative dose radiation sensor device of this disclosure. Radiation sensitive cell 12B may include or be a single-polysilicon Electrically Erasable Programmable Read Only Memory (EEPROM) cell formed as part of a CMOS integrated circuit. In this example, radiation sensitive cell 12B includes a floating gate 48, charging terminals 34 and 36, a ground terminal 16, and a cell output terminal 20. Radiation sensitive cell 12B may also include a metal oxide semiconductor (MOS) tunneling capacitor 42, a MOS control capacitor 44, and a MOS floating gate transistor 46 which has its gate terminal connected to floating gate 48. Floating gate transistor 46 includes a metal oxide semiconductor field effect transistor (MOSFET), illustratively depicted as an N-channel transistor in this example, and which may be a P-channel transistor in other examples. Floating gate transistor 46 has a "floating gate" because its only electrical connection is through electron tunneling. Radiation sensitive cell 12B may be formed using a polysilicon deposition process to form a single polysilicon layer for the control capacitor 44, the tunneling capacitor 42, and the floating gate transistor 46. Ground terminal 16 and cell output terminal 20 are connected to the MOSFET transistor of floating gate transistor 46.

Charging terminals 34 and 36 are connected to cell charging circuit 32B. Charging terminal 34 is thereby configured to deliver charge from cell charging circuit 32B to tunneling capacitor 42, while charging terminal 36 is thereby configured to deliver charge from cell charging circuit 32B to control capacitor 44. Cell charging circuit 32B may thereby charge up tunneling capacitor 42 and control capacitor 44, and thereby cause electrons to tunnel from a conduction band of tunneling capacitor 42, through an insulating layer 50, such as an oxide layer, into floating gate 48. Once cell charging circuit 32B charges tunneling capacitor 42 and control capacitor 44 to a certain level, cell charging circuit 32B causes a certain level of charge to be deposited on floating gate 48 in the form of the electrons tunneled to floating gate 48 from tunneling capacitor 42. The electrons remain on floating gate 48 after cell charging circuit 32B no longer provides a charge to tunneling capacitor 42. The charge on floating gate 48 also controls the state of floating gate transistor 46, in particular, by setting floating gate transistor 46 to a low resistance, in this example. This resistance may be the initial resistance Rs to which radiation sensitive cell 12 is initially set, as discussed above with reference to FIG. 1. Floating gate 48 may thereby be configured to be charged via tunneling capacitor 42, and radiation sensitive cell 12B may be set to the initial resistance when floating gate 48 is charged to the initial charge.

While the example above is discussed in terms of electrons being tunneled to floating gate 48, other examples may refer to charge carriers in general, so that cell charging circuit 32B may charge tunneling capacitor 42 with either a negative or positive charge, and tunneling capacitor 42 may donate either electrons or electrons holes to tunnel to floating gate 48.

Floating gate 48 may be configured such that the electrons (in this example) on floating gate 48 may be susceptible to be discharged by one or more forms of incident radiation 11. For the following discussion of incident radiation 11 discharging electrons from floating gate 48, this refers to incident radiation 11 of the specific type or energy range for which radiation sensitive cell 12B is configured to respond to. When incident radiation 11 strikes floating gate 48, it may discharge electrons on floating gate 48, which may propagate to the conduction band of tunneling capacitor 42. Floating gate 48 may be configured such that incident radiation 11 discharges electrons from floating gate 48 at a precisely understood rate, probability, or relation. Floating gate 48 may be configured such that each quantum of incident radiation 11 discharges one electron from floating gate 48, or has a certain precisely defined probability of discharging one electron from floating gate 48.

As additional radiation 11 strikes floating gate 48 over time, additional electrons discharge from floating gate 48. The probability for a given quantum of incident radiation 11 to dislodge an electron from floating gate 48 may vary over time, such as by decreasing as the charge density on floating gate 48 decreases. This variation in the relation between the cumulative amount of incident radiation 11 over time and the remaining charge on floating gate 48 may be taken into account in the configuration of radiation sensitive cell 12B and of a cumulative dose radiation sensor device that incorporates radiation sensitive cell 12B. In various examples, the amount of charge remaining on floating gate 48 may therefore be a precisely understood representation for the amount of incident radiation 11 that has struck floating gate 48 cumulatively over time. Floating gate 48 may therefore be configured to be discharged in response to incident radiation 11, wherein radiation sensitive cell 12B varies in resistance as a function of floating gate 48 being discharged in response to the incident radiation 11.

As indicated above, floating gate transistor 46 of radiation sensitive cell 12B may be configured to apply a resistance between the ground terminal 16 and the cell output terminal 20. In this particular example, once cell charging circuit 32B charges the radiation sensitive cell 12B, and in particular floating gate 48, to its initial charge, floating gate transistor 46 may apply an initial gate voltage that is relatively low between ground terminal 16 and cell output terminal 20, thereby also applying an initial resistance, which may also be a relatively low resistance, between ground terminal 16 and cell output terminal 20. Floating gate transistor 46 may then apply a resistance between ground terminal 16 and cell output terminal 20 that increases cumulatively as the charge on floating gate 48 decreases cumulatively from its initial charge, as floating gate 48 is struck by incident radiation 11. Radiation sensitive cell 12B may therefore be configured to apply a resistance between the ground terminal 16 and the cell output terminal 20 that varies in cumulative response to radiation incident to the floating gate 48 and discharging the floating gate 48, in this example.

An example of cumulative dose radiation sensor device 10 of FIG. 1 may use radiation sensitive cell 12B of FIG. 2 as its radiation sensitive cell 12 as in FIG. 1. In this example, as in the examples discussed above with reference to FIG. 1, the cell output terminal 20 may have a voltage that varies in response to the varying of the resistance applied by the radiation sensitive cell 12B between the ground terminal 16 and the cell output terminal 20. Radiation sensitive cell 12B may therefore function to vary the voltage of cell output terminal 20 sufficient to reach the threshold voltage Vt indicating that radiation sensitive cell 12B has been exposed to the threshold amount of incident radiation 11, thereby prompting comparator 24 to deliver its output signal to counter 30 and to cell charging circuit 32. Cell charging circuit 32 may be implemented to include cell charging circuit 32B of FIG. 2, which may once again charge floating gate 48 to the initial charge.

As indicated above with reference to FIG. 1, radiation sensitive cell 12B may experience no electron tunneling or other effects that induce any changes in the resistance Rs that radiation sensitive cell 12B applies other than the cumulative dose of radiation of the selected type or range. This may be ensured by providing the insulating layer 50, which may be implemented as an oxide layer, with a sufficient thickness to drive random, unprompted electron tunneling from floating gate 48 back to the conduction band of tunneling capacitor 42, i.e., electron tunneling in the absence of incident radiation, to a negligible rate. Growing the oxide layer to a sufficient thickness for this purpose may be done within the scope of standard CMOS manufacturing processes and may not require custom CMOS processes, in various examples.

While floating gate transistor 46 is implemented as an NMOS transistor in the example of FIG. 2, various examples may also use a PMOS transistor. In these examples, the radiation sensitive cell may begin at a high initial resistance and the cell output may begin at a high initial voltage, and the cell resistance and cell output voltage may decrease cumulatively as a function of the cumulative dose of radiation that the radiation sensitive cell intercepts. In still other examples, the radiation sensitive cell may be connected between a source voltage and the cell output rather than between a ground voltage and the cell output, and switch places with the reference resistor as depicted in FIG. 1, in which case the output voltage would also switch, and go cumulatively from high to low with a PMOS implementation of the radiation sensitive cell or from low to high with an NMOS implementation of the radiation sensitive cell. In these variations encompassed by the present disclosure, the radiation sensitive cell may still deliver an output voltage that varies cumulatively over time, either up or down in various examples, to track a cumulative dose of radiation, and which may reach a threshold voltage, either from a higher or lower initial voltage, and an output signal may be delivered once the threshold voltage is reached.

Figure 3:
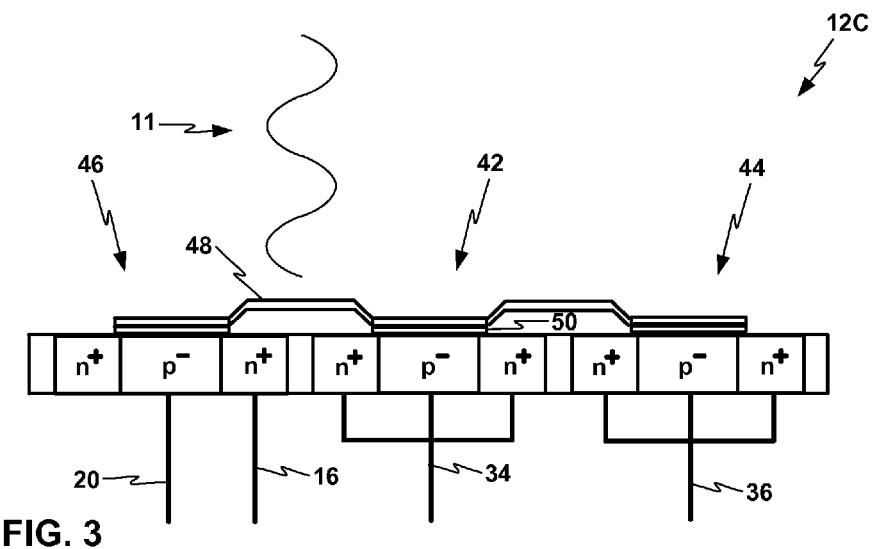
FIG. 3 is a schematic diagram of an illustrative example of a radiation sensitive cell that may be part of a cumulative dose radiation sensor device of this disclosure.

FIG. 3 is a schematic diagram of an illustrative example of a radiation sensitive cell 12C that may form part of a cumulative dose radiation sensor device of this disclosure, such as cumulative dose radiation sensor device 10 of FIG. 1. While FIG. 3 shows additional physical detail, radiation sensitive cell 12C of FIG. 3 may form an implementation of radiation sensitive cell 12B of FIG. 2, and all reference numbers in FIG. 3 indicate the corresponding elements of the same reference numbers in FIG. 2.

As shown in FIG. 3, floating gate transistor 46, tunneling capacitor 42, and control capacitor 44 may all be formed from a single-polysilicon EEPROM cell, each formed with a p$^-$ region surrounded by n$^+$ regions. Radiation sensitive cell 12C may be formed with a single polysilicon layer. Radiation sensitive cell 12C may therefore be formed with a standard CMOS process, and may be manufactured without requiring any custom CMOS processes in various examples. Other examples may also include other arrangements of doped regions in the capacitors, including asymmetric capacitors, in which the tunneling capacitor 42 and the control capacitor 44 are formed with n$^+$/p$^-$/p+ doped regions, for example. Other examples may also include multiple control capacitors and/or multiple tunneling capacitors, for example.

Figure 4:
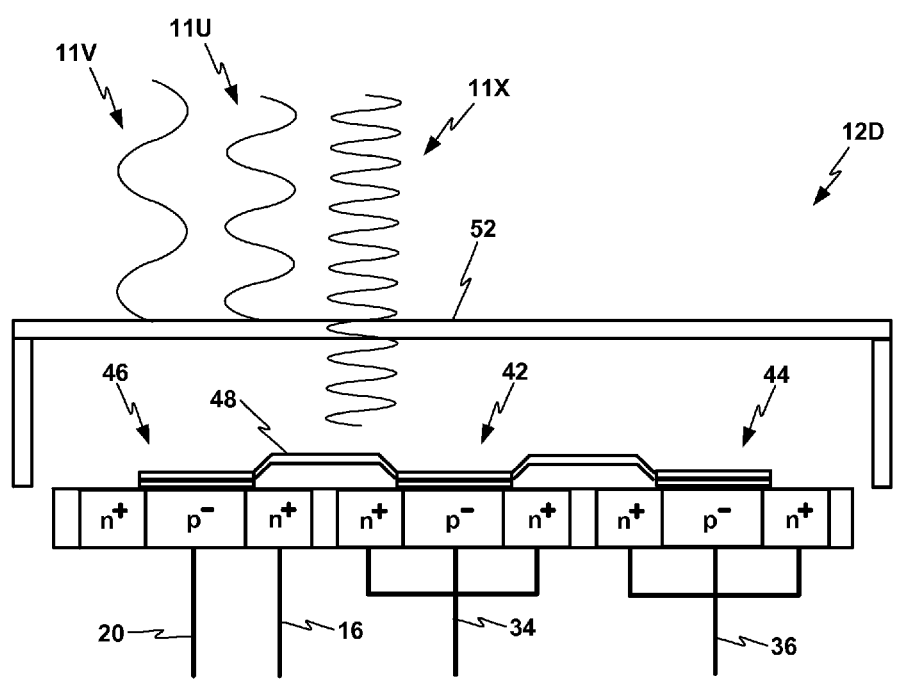
FIG. 4 is a schematic diagram of an illustrative example of a radiation sensitive cell that may be part of a cumulative dose radiation sensor device of this disclosure.

FIG. 4 is a schematic diagram of another illustrative example of a radiation sensitive cell 12D that may also form part of a cumulative dose radiation sensor device of this disclosure, such as cumulative dose radiation sensor device 10 of FIG. 1. Radiation sensitive cell 12D of FIG. 4 is similar to radiation sensitive cell 12C of FIG. 3, and with all corresponding reference numbers in common with FIGS. 2 and 3. Radiation sensitive cell 12D of FIG. 4 differs from radiation sensitive cell 12C of FIG. 3 in that it also includes a frequency-selective shield 52 positioned over floating gate 48. Frequency-selective shield 52 is one way in which a radiation sensitive cell of this disclosure may be tailored to be sensitive only to certain types or frequencies of radiation, and insensitive to other types or frequencies of radiation.

For example, radiation sensitive cell 12D may alternately be exposed to visible light radiation 11V, soft ultraviolet radiation 11U, and hard ultraviolet radiation 11X, at various times or at the same time. As shown in the example of FIG. 4, the particular frequency-selective shield 52 used in radiation sensitive cell 12D may be opaque to visible light radiation 11V and soft ultraviolet radiation 11U, but may be transparent to hard ultraviolet radiation 11X. This particular configuration of radiation sensitive cell 12D may be included in a cumulative dose radiation sensor device for which visible light and soft ultraviolet light are not of concern, but hard ultraviolet exposure is of concern, and it is desired to track the cumulative exposure of the cumulative dose radiation sensor device to hard ultraviolet radiation. There may also be a particular portion of the hard ultraviolet frequency range that is of concern, such as UVC radiation for a germicidal application, and that frequency-selective shield 52 is configured to admit selectively, such as hard UVC radiation of approximately 100 to 280 nanometers in wavelength for a germicidal application (i.e. an energy of approximately 4.4 to 12.4 eV), while blocking out the portion of the ultraviolet range that is not of concern (such as soft ultraviolet radiation of lower energy).

Frequency-selective shield 52 may therefore prevent radiation incident on radiation sensitive cell 12D that is outside a frequency range of interest from intercepting floating gate 48 or having a chance to affect the charge carriers on floating gate 48. In other examples, a variety of other means may be used for ensuring that floating gate 48 is only selectively discharged by incident radiation having frequencies or energy levels of interest, while floating gate 48 remains unaffected by other radiation. While the particular example of FIG. 4 depicts a frequency-selective shield 52 that is configured to block visible and soft ultraviolet light but admit hard ultraviolet radiation, other examples may use means to admit or block any one or more portions of the electromagnetic spectrum and/or other forms of radiation, such as cosmic rays. In various examples, therefore, the resistance applied by radiation sensitive cell 12D between the ground terminal 16 and the cell output terminal 20 varies in cumulative response to radiation of a first frequency range discharging the floating gate 48, and wherein radiation of a second frequency range does not discharge the floating gate 48.

A similar effect may be implemented in the floating gate 48 itself, such that floating gate 48 is inherently only responsive to incident radiation of certain frequency ranges, and only discharges electrons when exposed to radiation of those certain frequency ranges, while not discharging electrons when exposed to radiation of other frequency ranges. For example, various implementations of floating gate 48 may discharge electrons when exposed to ultraviolet light, X-rays, gamma rays, or cosmic rays, but not when exposed to visible light. In other implementations, floating gate 48 may discharge electrons when exposed to visible light, ultraviolet light, X-rays, gamma rays, or cosmic rays, but not when exposed to infrared light, microwaves, or radio waves. Floating gate 48 may therefore be sensitive to a first frequency range of radiation and not be sensitive to a second frequency range of radiation, and radiation sensitive cell 12D may vary in resistance between the ground terminal 16 and the output terminal 20 in cumulative response only to radiation in the first frequency range discharging the floating gate 48.

Figure 5:
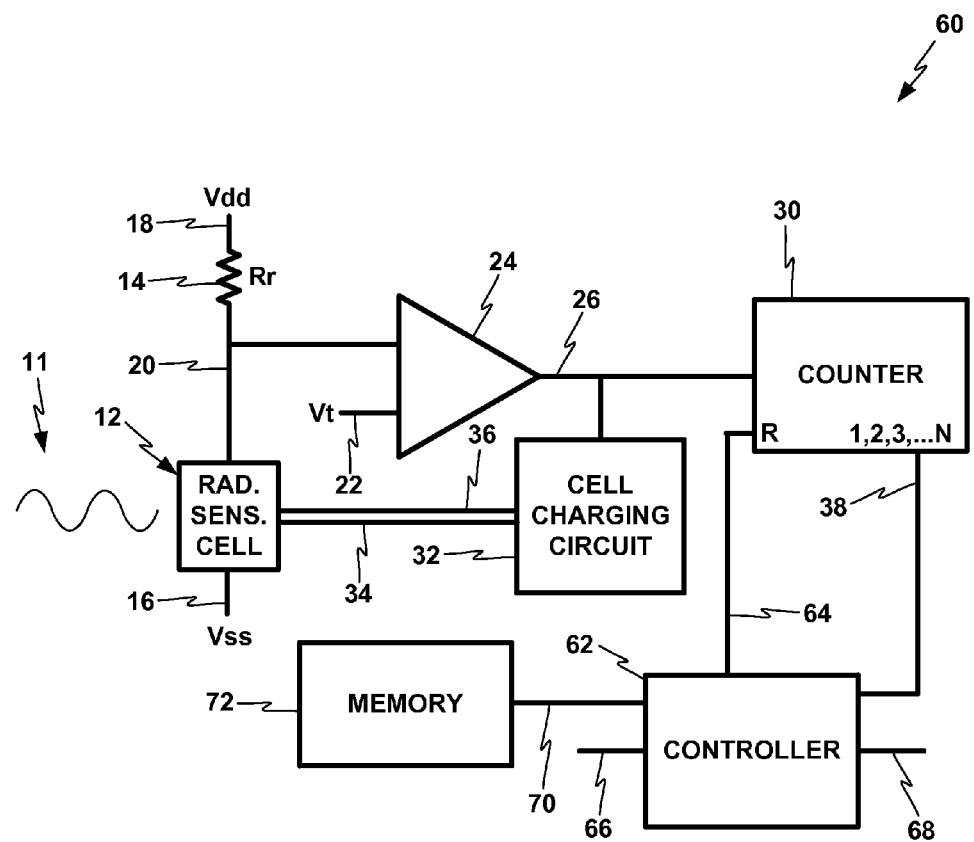
FIG. 5 is a circuit diagram of an illustrative example of a cumulative dose radiation sensor device of this disclosure.

FIG. 5 is a circuit diagram of another illustrative example of a cumulative dose radiation sensor device 60 of this disclosure. Cumulative dose radiation sensor device 60 of FIG. 5 is similar in many of its elements to cumulative dose radiation sensor device 10 of FIG. 1, and all the reference numbers shared in common between FIGS. 1 and 5 refer to the identical elements in FIG. 5. Cumulative dose radiation sensor device 60 of FIG. 5 may also incorporate any of the example radiation sensitive cells 12B, 12C, 12D of FIGS. 2-4 for its radiation sensitive cell 12. Cumulative dose radiation sensor device 60 of FIG. 5 differs in that it also includes a controller 62 and a memory component 72, with various connections among these components and the other elements of cumulative dose radiation sensor device 60. Controller 62, memory component 72, and the rest of cumulative dose radiation sensor device 60 may all form part or all of an integrated circuit, for example. The integrated circuit may also include any of a number of other components, potentially including additional memory components, for example.

Controller 62 is connected to a counter output 38 of the counter 30, wherein the controller is configured to receive an output of the count maintained by counter 30, and to receive updates of the count when counter 30 updates its count of the number of times comparator 24 has delivered its output signal. Controller 62 is further configured to execute a selected action in response to the output from the counter 30 reaching a selected threshold count, which may be selected as any number of 1 or greater. The selected action taken by controller 62 in response to counter 30 hitting the selected threshold count may include at least one action selected from among a group of potential actions.

For example, the action or actions performed by controller 62 may include sending a signal to other elements outside of the integrated circuit of which cumulative dose radiation sensor device 60 forms a part. Controller 62 may also deliver a signal indicating whether or not the integrated circuit has been exposed to more than a selected cumulative dose of radiation. This may include causing other elements of the integrated circuit to deliver a signal from the integrated circuit to other elements of a communication system, computing system, and/or other electronic system, to communicate the information of how much cumulative dose of the selected type or frequency range of radiation to which cumulative dose radiation sensor device 60 has been exposed.

Controller 62 also has a connection 64 to a reset input of counter 30, and is thereby configured to reset the count maintained by counter 30, such as to 0. This may be a desirable option if the cumulative dose of radiation to which cumulative dose radiation sensor device 60 has been exposed in the past is no longer of interest, and instead it is only desired to track the cumulative dose of radiation to which cumulative dose radiation sensor device 60 will be exposed for a duration of time in the future. Controller 62 also has system input connections 66 and system output connections 68 on which it receives and sends data to the rest of the integrated circuit of which cumulative dose radiation sensor device 60 forms a part. For example, controller 62 may send a disable command to the rest of the integrated circuit, or to a larger system, via system output connections 68.

Figure 6:
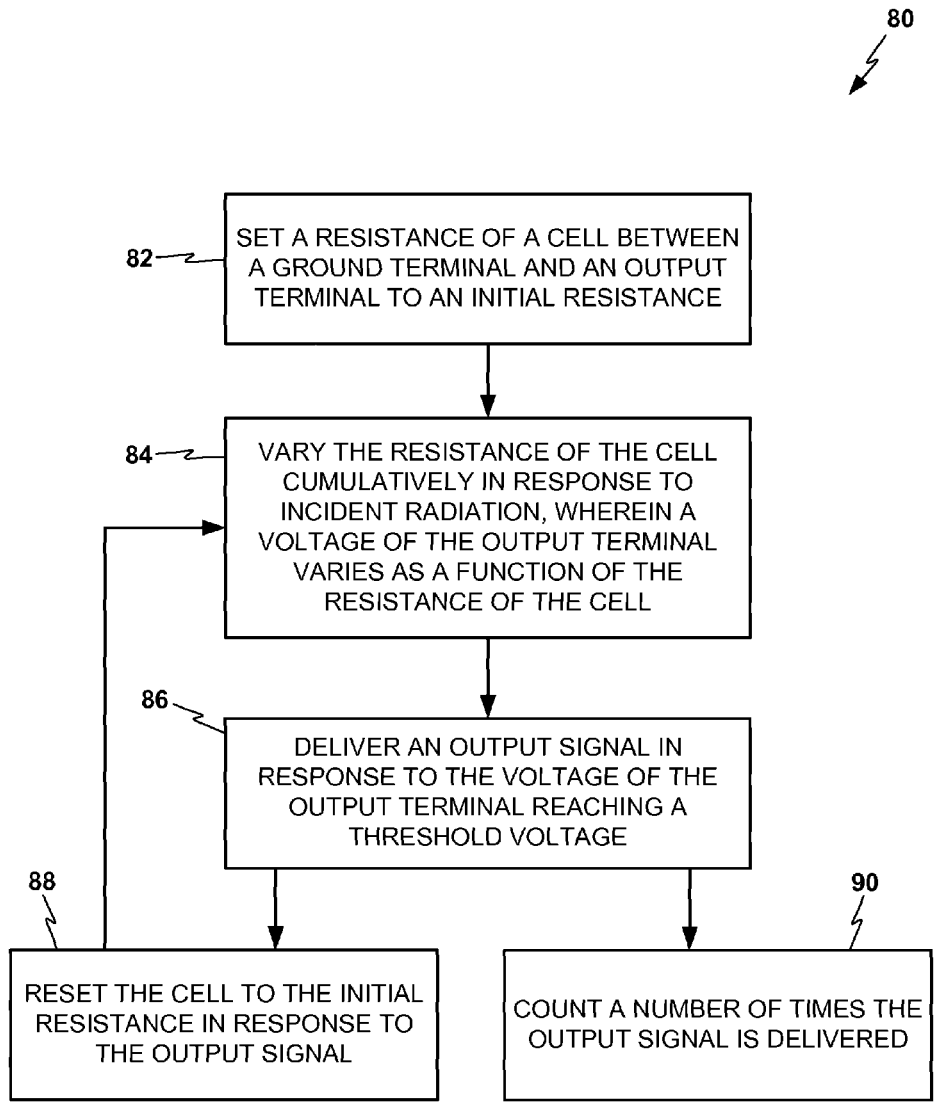
FIG. 6 is a flowchart of an illustrative example of a process for measuring a cumulative radiation dose with a cumulative dose radiation sensor device of this disclosure.

FIG. 6 is a flowchart of an illustrative example of a process 80 for measuring a cumulative radiation dose with a cumulative dose radiation sensor device of this disclosure, such as cumulative dose radiation sensor devices 10 or 60 of FIGS. 1 and 5. Process 80 may be performed by, implemented in, or embodied in a device configured for carrying out process 80 or portions thereof, which may include any of the devices depicted in FIGS. 1-5 and described above with reference thereto. Reference numerals from FIGS. 1-5 are also used below to indicate representative examples of how various elements of process 80 may relate to the devices of FIGS. 1-5.

In process 80, a device may set a resistance of a cell, such as a radiation sensitive cell 12, 12B, 12C, 12D, between a ground terminal 16 and an output terminal 20 to an initial resistance (82). The device may then vary the resistance of the cell cumulatively in response to incident radiation, wherein a voltage of the output terminal 20 varies as a function of the resistance of the cell (84). The device may deliver an output signal, such as the output signal provided by comparator 24 on comparator signal terminal 26, in response to the voltage of the output terminal 20 reaching a threshold voltage (86). The device may then reset the cell to the initial resistance in response to the output signal, such as by action of the cell charging circuit 32 or 32B (88), and count a number of times the output signal is provided, such as by counter 30 (90). With the cell reset to the initial resistance, the device may then once again vary the resistance of the cell cumulatively in response to incident radiation, wherein a voltage of the output terminal 20 varies as a function of the resistance of the cell (84), and continue to repeat the remaining portions of the process 80.

The techniques described herein may be able to produce integrated circuits that implement logic using a CMOS process technology. The circuit components described in this disclosure can be implemented as discrete components, as one or more elements of one or more integrated devices, or any combination thereof. The circuit components described herein may be fabricated using any of a wide variety of process technologies including CMOS process technologies, including either standard or custom CMOS process technologies. In addition, the circuitry described herein may be used in various applications including telecommunications applications, general computing application, or any application that may utilize a radiation sensing system.

Various aspects of the disclosure have been described. These and other aspects are within the scope of the following claims.

The invention claimed is:
1. A device comprising:
a cell configured to be set to an initial resistance and to vary in resistance cumulatively in response to incident radiation;

an output terminal connected to the cell and configured to vary in voltage in response to the resistance of the cell;

a comparator configured to deliver an output signal in response to the voltage of the output terminal reaching a threshold voltage;

a cell charging circuit configured to reset the cell to the initial resistance in response to the output signal from the comparator; and a counter configured to count a number of times the comparator delivers the output signal.

2. The device of claim 1, wherein the cell comprises a floating gate and a metal oxide semiconductor (MOS) tunneling capacitor, wherein the floating gate is configured to be charged via the MOS tunneling capacitor, and the cell is set to the initial resistance when the floating gate is charged to an initial charge.

3. The device of claim 2, wherein the floating gate is configured to be discharged in response to incident radiation, wherein the cell varies in resistance as a function of the floating gate being discharged in response to the incident radiation.

4. The device of claim 1, wherein the cell comprises a MOSFET transistor comprising a floating gate, a ground terminal, and an output terminal, wherein the cell is set to the initial resistance between the ground terminal and the output terminal when the floating gate is charged to an initial charge, and wherein the cell varies in resistance between the ground terminal and the output terminal in cumulative response to radiation discharging the floating gate.

5. The device of claim 4, wherein the floating gate is sensitive to a first frequency range of radiation and is not sensitive to a second frequency range of radiation, wherein the cell varies in resistance between the ground terminal and the output terminal in cumulative response to radiation in the first frequency range discharging the floating gate.

6. The device of claim 1, further comprising a controller connected to an output of the counter, wherein the controller is configured to execute a selected action in response to the output from the counter reaching a selected threshold count.

7. The device of claim 6, wherein, in response to the output from the counter reaching the selected threshold count, the controller is configured to deliver a signal indicating whether or not the integrated circuit has been exposed to more than a selected cumulative dose of radiation.

8. The device of claim 7, wherein delivering the signal comprises causing another element of the integrated circuit to deliver a signal to communicate how much cumulative dose of a selected type or frequency range of radiation to which the device has been exposed.

9. The device of claim 1, wherein the cell comprises a single-polysilicon EEPROM cell that comprises a control capacitor, a tunneling capacitor, a floating gate transistor, and a floating gate positioned between the tunneling capacitor and the floating gate transistor.

10. The device of claim 9, wherein the single-polysilicon EEPROM cell is formed with standard CMOS processes.

11. An integrated circuit comprising:
an EEPROM cell comprising a floating gate, charging terminals, a ground terminal, and an output terminal, wherein the EEPROM cell is configured to apply a resistance between the ground terminal and the output terminal that varies in response to radiation incident to the floating gate;

a cell charging circuit connected to the charging terminals and configured to charge the EEPROM cell to apply an initial resistance between the ground terminal and the output terminal;

a reference resistor connected between the output terminal and a voltage source terminal, wherein the output terminal has a voltage that varies in response to the varying of the resistance applied by the EEPROM cell between the ground terminal and the output terminal;

a comparator comprising a first input connected to the output terminal and a second input connected to a threshold voltage, wherein the comparator is configured to deliver an output signal in response to the voltage of the output terminal reaching the threshold voltage;

wherein the cell charging circuit is configured to receive the output signal from the comparator and to recharge the EEPROM cell to apply the initial resistance in response to receiving the output signal from the comparator; and a counter configured to count a number of times the comparator delivers the output signal.

12. The integrated circuit of claim 11, wherein the EEPROM cell further comprises a control capacitor, a tunneling capacitor, and a floating gate transistor;

wherein the charging terminals are connected to the control capacitor and the tunneling capacitor;

wherein the EEPROM cell is charged to apply the initial resistance between the ground terminal and the output terminal when the floating gate is charged to an initial charge from the cell charging circuit via the tunneling capacitor; and wherein the resistance applied by the EEPROM cell between the ground terminal and the output terminal varies in cumulative response to radiation discharging the floating gate.

13. The integrated circuit of claim 11, wherein the EEPROM cell is formed with a single polysilicon layer.

14. The integrated circuit of claim 11, further comprising a frequency-selective shield positioned over the floating gate, wherein the resistance applied by the EEPROM cell between the ground terminal and the output terminal varies in cumulative response to radiation of a first frequency range discharging the floating gate, and wherein radiation of a second frequency range does not discharge the floating gate.

15. The integrated circuit of claim 11, further comprising a controller connected to an output of the counter, wherein the controller is configured to execute a selected action in response to the output from the counter reaching a selected threshold count, the selected action comprising delivering a signal indicating whether or not the integrated circuit has been exposed to more than a selected cumulative dose of radiation.

16. A method comprising:
setting a resistance of a cell between a ground terminal and an output terminal to an initial resistance;

varying the resistance of the cell cumulatively in response to incident radiation, wherein a voltage of the output terminal varies as a function of the resistance of the cell;

delivering an output signal in response to the voltage of the output terminal reaching a threshold voltage;

resetting the cell to the initial resistance in response to the output signal; and counting a number of times the output signal is delivered.

17. The method of claim 16, wherein varying the resistance of the cell cumulatively in response to incident radiation is performed regardless of whether the cell is powered.

18. The method of claim 16, further comprising:
delivering power to the cell at intervals, wherein the cell is unpowered between the intervals;

wherein delivering the output signal in response to the voltage of the output terminal reaching a threshold voltage is performed only during the intervals when power is delivered to the cell.

19. The method of claim 16, wherein varying the resistance of the cell cumulatively in response to incident radiation is performed for radiation in a first frequency range not for radiation in a second frequency range.

20. The method of claim 16, further comprising delivering a signal indicating whether or not the cell has been exposed to more than a selected cumulative dose of radiation if the number of times counted that the output signal is delivered reaches a selected threshold count.

\* \* \* \* \*